(12) United States Patent
Wu et al.

(10) Patent No.: US 9,001,924 B1
(45) Date of Patent: Apr. 7, 2015

(54) MATRIX INVERSION

(71) Applicant: Xilinx, Inc., San Jose, CA (US)

(72) Inventors: Michael Wu, Palo Alto, CA (US); Bei Yin, Houston, TX (US); Aida Vosoughi, Houston, TX (US); Christopher H. Dick, San Jose, CA (US); Christoph E. Studer, Houston, TX (US); Joseph R. Cavallaro, Pearland, TX (US)

(73) Assignee: Xilinx, Inc., San Jose, CA (US)

( * ) Notice: Subject to any disclaimer, the term of this patent is extended or adjusted under 35 U.S.C. 154(b) by 37 days.

(21) Appl. No.: 13/757,084

(22) Filed: Feb. 1, 2013

(51) Int. Cl.
  *H04L 27/00* (2006.01)
  *H04B 7/04* (2006.01)
  *G06F 17/16* (2006.01)

(52) U.S. Cl.
  CPC .............. *H04B 7/0456* (2013.01); *G06F 17/16* (2013.01)

(58) Field of Classification Search
  CPC ......... H04L 27/01; H04L 27/06; H04L 27/18; H04L 27/38; H04L 7/0413; H04B 7/0413; H04B 7/0465
  USPC .......................... 375/267, 295, 299, 340, 341
  See application file for complete search history.

(56) References Cited

U.S. PATENT DOCUMENTS

| | | | |
|---|---|---|---|
| 2005/0207477 A1* | 9/2005 | Monsen | 375/147 |
| 2006/0245513 A1* | 11/2006 | Koo et al. | 375/267 |
| 2007/0167192 A1* | 7/2007 | Li et al. | 455/562.1 |
| 2008/0192841 A1* | 8/2008 | Chen et al. | 375/259 |
| 2010/0293210 A1* | 11/2010 | Sima et al. | 708/209 |
| 2012/0140848 A1* | 6/2012 | Lin et al. | 375/296 |
| 2014/0146862 A1* | 5/2014 | Aubert | 375/224 |

\* cited by examiner

*Primary Examiner* — Syed Haider
(74) *Attorney, Agent, or Firm* — W. Eric Webosted; Lois D. Cartier

(57) ABSTRACT

An apparatus relating generally to matrix inversion is disclosed. This apparatus includes a matrix inversion module coupled to receive matrix information and to provide an approximation of an inversion of the matrix information. The matrix inversion module comprises a decomposition block coupled to receive the matrix information and to decompose the matrix information into diagonal matrix information and off diagonal matrix information, and an expansion block. The expansion block is coupled to receive the diagonal matrix information and the off diagonal matrix information, and to invert a matrix sum of the diagonal matrix information and the off diagonal matrix information by generation of a portion of a series expansion.

16 Claims, 4 Drawing Sheets

| | Equation (5) | Div. ÷ | Mult. × | Add + |
|---|---|---|---|---|
| k=1 | D⁻¹ | M | 0 | 0 |
| k=2 | (I - D⁻¹E)D⁻¹ | M | 4M(M - 1) | 2(M² - M) |
| k=3 | (I - D⁻¹E(I - D⁻¹E))D⁻¹ | M | above + 4M(M - 1)² | above + 2M³ - 2M² + M |
| k≥3 | $\sum_{n=0}^{k-1}(-D^{-1}E)^n D^{-1}$ | M | (k - 2)4M²(M - 1) | (k-2)2M³ - M |

Columns: 510, 511, 501, 502, 503 (500)

MATRIX INVERSION

TECHNICAL FIELD

An embodiment relates to integrated circuit devices ("ICs"). More particularly, an embodiment relates to matrix inversion for an IC.

BACKGROUND

Multiple-input, multiple-output ("MIMO") operation in combination with spatial multiplexing is used in various wireless communication specifications, such as 3GPP LTE and IEEE 802.11n for example. Multiuser MIMO systems have goals of high link reliability and channel throughput, including instances where multiple spatially separated users are concurrently serviced. In MIMO systems, multiple data streams may be concurrently transmitted in a same frequency band. However, conventional point-to-point and multiuser MIMO systems have ever increasing demands on throughput, and limits on throughput of such MIMO systems are quickly approaching due to such increasing demand. Furthermore, there is more competition for frequency bands for wireless communication.

Accordingly, it would be desirable and useful to provide a transmission and/or a reception technology that facilitates meeting a growing demand for higher throughput without a further increase in communication bandwidth.

SUMMARY

An apparatus relates generally to matrix inversion. In such an apparatus, a matrix inversion module is coupled to receive matrix information to provide an approximation of an inversion of the matrix information. The matrix inversion module includes a decomposition block coupled to receive the matrix information to decompose the matrix information into diagonal matrix information and off diagonal matrix information, and an expansion block. The expansion block is coupled to receive the diagonal matrix information and the off diagonal matrix information to invert a matrix sum of the diagonal matrix information and the off diagonal matrix information by generation of a portion of a series expansion.

A method relates generally to matrix inversion. In such a method, a decomposition block receives input matrix information. The decomposition block decomposes the input matrix information into diagonal matrix information and off diagonal matrix information. The diagonal matrix information and the off diagonal matrix information is received by an expansion block. The expansion block generates a portion of a series expansion to provide an inversion of a matrix sum of the diagonal matrix information and the off diagonal matrix information. The portion of the series expansion is an approximation of an inversion of the input matrix information.

BRIEF DESCRIPTION OF THE DRAWINGS

Accompanying drawings show exemplary structures and methods. However, the accompanying drawings should not be taken to limit the structures and methods shown, but are for explanation and understanding only.

FIG. 3-1 is a block diagram depicting an exemplary matrix inversion module.

FIG. 3-2 is a block diagram depicting the exemplary matrix inversion module of FIG. 3-1 having an expansion block configured for two terms.

DETAILED DESCRIPTION

Figure 1:
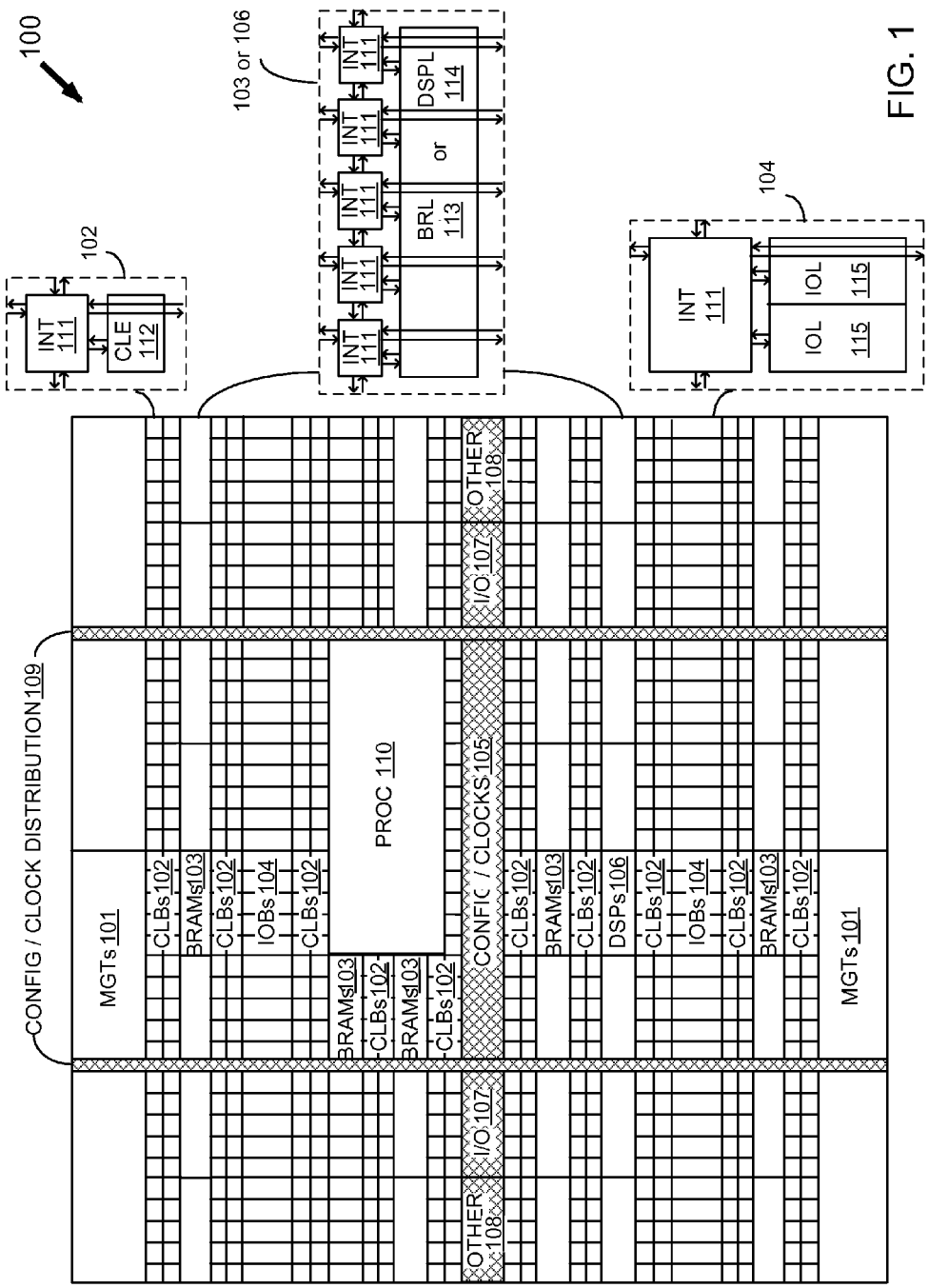
FIG. 1 is a simplified block diagram depicting an exemplary columnar Field Programmable Gate Array ("FPGA") architecture.

In the following description, numerous specific details are set forth to provide a more thorough description of the specific examples described herein. It should be apparent, however, to one skilled in the art, that the invention may be practiced without all the specific details given below. In other instances, well known features have not been described in detail so as not to obscure the examples. For ease of illustration, the same number labels are used in different diagrams to refer to the same items; however, in alternative embodiments the items may be different.

Before describing the examples illustratively depicted in the several figures, a general introduction is provided to further understanding.

Large-scale or "massive" MIMO systems use antenna arrays having an order of magnitude more antenna elements than small-scale MIMO systems. Such large-scale MIMO systems may have multiple small and low-power antenna units. Thus, if one or more antenna units fail in a large-scale MIMO system, overall performance is not as severely impacted as with such failure in a small-scale MIMO system. Furthermore, in a large-scale MIMO system, antenna units may be swapped on the fly to replace failing antenna units. These and other advantages of large-scale MIMO over small-scale MIMO are known. However, having a large number of antenna units significantly increases complexity in large-scale MIMO as compared with small-scale MIMO. For example, data detection at a basestation involves channel matrix inversion for a linear detection scheme, and, with so many more antenna units, inversion of such a large channel matrix H adds a significant computational burden. In large-scale MIMO systems, inversion of channel matrix H may be performed on both uplink and downlink sides of a channel. With the above general understanding borne in mind, various embodiments for channel matrix inversion which may be used in a large-scale MIMO system are generally described below.

Along those lines, a matrix inversion approximation is described below, which may be used on an uplink and/or downlink side of a channel matrix in large-scale MIMO communication system. Such matrix inversion may have a slight degradation in performance while substantially reducing complexity as compared with an exact matrix inversion, such as Cholesky decomposition, direct matrix inversion, QR decomposition, or LU factorization for example. As described below in additional detail, an inverse matrix is approximated with a finite number of Neumann-series terms. This approximation is provided to reduce computational complexity while providing a capability to obtain near-optimal transmission reliability. While such approximation may be more useful in large-scale MIMO systems due to the number of antenna units, small-scale MIMO systems or other wireless communications systems may benefit from a channel matrix inversion approximation as described herein.

Because one or more of the examples are described herein using a particular type of IC, a detailed description of such an IC is provided below. However, it should be understood that other types of ICs may benefit from one or more of the techniques described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
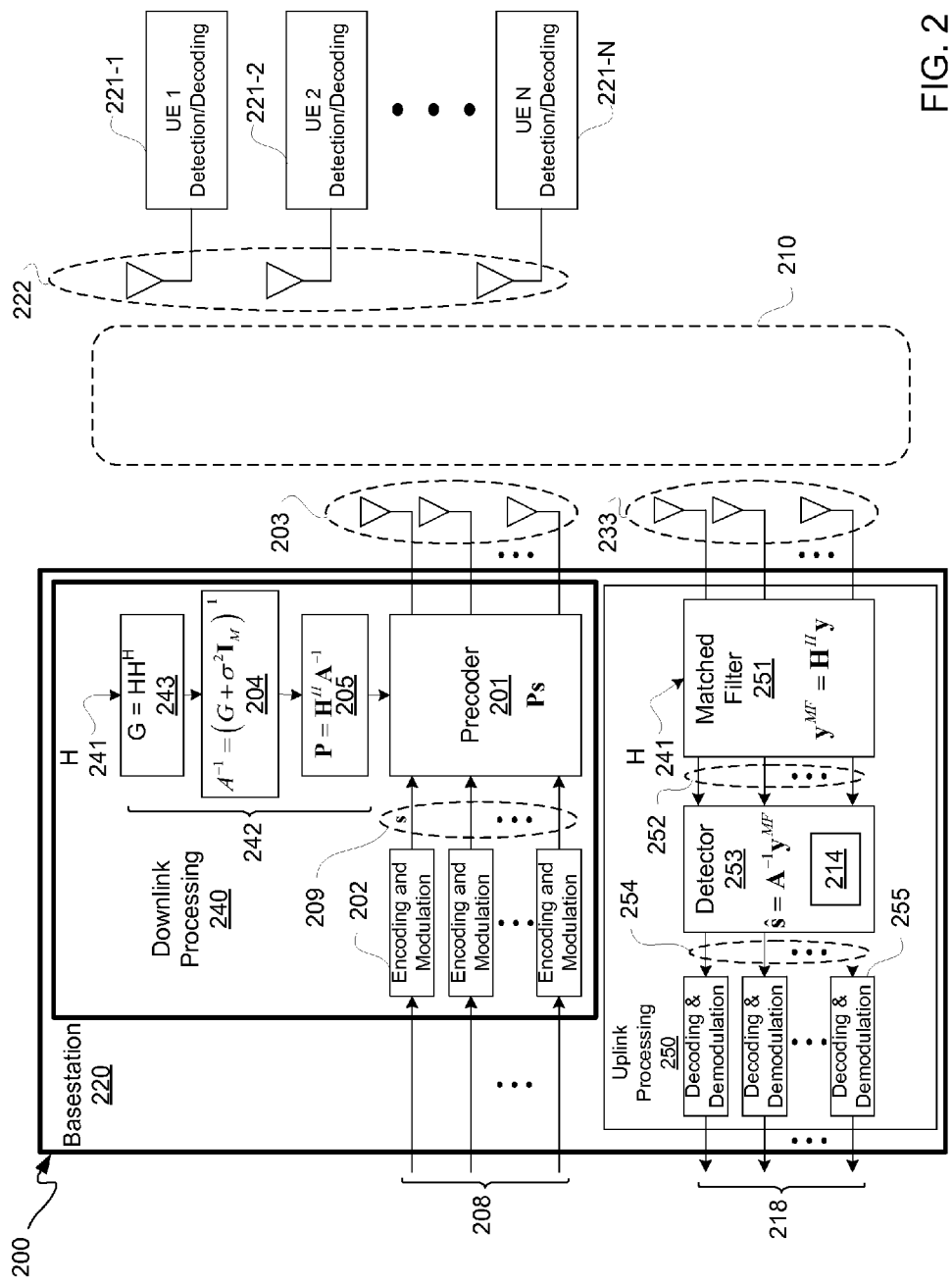
FIG. 2 is a block diagram depicting an exemplary communication system.

FIG. 2 is a block diagram depicting an exemplary communication system 200. Communication system 200 includes a "basestation" 220 and wireless devices, sometimes referred to as "users" or "user equipment units", 221-1 through 221-N, for N a positive integer equal to or greater than 1 (collectively and singly "UE" 221). Typically, more than one user 221 is coupled to basestation 220 at a time. UE 221 is coupled to basestation 220 via over-the-air ("wireless") communication channels 210. As is well-known, a channel matrix H may be used to represent such one or more communication channels 210.

Communications system 200 is for bidirectional communication, namely a downlink for sending information from basestation 220 to UE 221 and an uplink for sending information from UE 221 to basestation 220. Basestation 220 may include a downlink processing section 240 and an uplink processing section 250. Along those lines, both uplink and downlink sides of a communications channel are described below.

With reference to a downlink processing section 240, a plurality of encoding and modulation blocks 202, namely encoders and modulators, may be coupled to receive data for transmission 208 to encode and modulate such data to provide encoded and modulated information streams, s, 209 to a precoder 201 for precoding, Ps, for P a precoding matrix. Precoder 201 may be for large-scale multiple-in, multiple-output ("MIMO") transmission of basestation 220.

Downlink processing section 240 may be coupled to receive a channel matrix H 241 to a processing block 242. Processing block 242 may be implemented in hardware, software, or a combination of hardware and software. For purposes of clarity and not limitation, it shall be assumed that modules of processing block 242 are implemented using various hardware resources, such as for example DSP slices, BRAM, and programmable resources of an FPGA; however, in other embodiments, digital signal processors, microprocessors, multi-core processors, memory, and/or other hardware may be used.

Modules of processing block 242 include a Gram Matrix module 243, a matrix inversion module 204, and a precoding matrix, P, module 205. Gram Matrix module 243 may be coupled to receive channel matrix H 241 to compute or otherwise determine a Gram Matrix, G, where $G=HH^H$. A Gram Matrix G so determined may be output from Gram Matrix module 243 for input to matrix inversion module 204. Matrix inversion module 204 may be used to provide an inversion of "regularized matrix information" as described below in additional detail. Along those lines, matrix inversion module 204 may be said to be configured to compute or otherwise determine an inversion of a matrix A using such Gram Matrix G generally as follows, $$A^{-1} = (G + \sigma^{-2} I_M)^{-1}$$

for MMSE, and for ZF, the sigma squared term equals zero, so $A^{-1} = G^{-1}$.

An inverted matrix A, $A^{-1}$, may be output from matrix inversion module 204 for input to precoding matrix, P, module 205. As described below in additional detail, output from matrix inversion module 204 may be an estimate of an inversion of matrix A. Using a transpose of a channel matrix H and such inverted matrix A, $A^{-1}$, input, precoding matrix, P, module 205 may be configured to compute or otherwise determine a precoding matrix, P, as $P = H^H A^{-1}$. Precoding matrix module 205 output P may be provided as input to precoder 201 for precoding outputs s with precoding matrix P to provide Ps outputs to an array of transmission antennas 203 for a downlink transmission of information to UE 221.

Other details regarding downlink processing section 240 of basestation 220, such as for example a serial-to-parallel converter and an Inverse Fast Fourier Transformer as might be found in an OFDM system, among other details, are not described in detail herein for purposes of clarity and not limitation.

With reference to an uplink processing section 240, an array of reception antennas 233 may be coupled to receive information from UE 221. A matched filter ("MF") 251 may be coupled to receive a channel matrix, H, 241, to provide a matched filter output, $y^{MF}$, which equals $H^H y$, where y is received input from array of reception antennas 233. Matched filter outputs, $y^{MF}$, 252 may be provided from matched filter 251 to detector 253. Matched filter outputs, $y^{MF}$, 252 may be multiplied by an inverted matrix A, $A^{-1}$, to provide receiver detector outputs 254. Detector 253 may include a matrix inversion module 214 to provide an estimate of an inversion of matrix A, as described below in additional detail. Receiver detector outputs 254 may be respectively provided as inputs to decoding and demodulation blocks 255, namely decoders and demodulators. Decoding and demodulation blocks 255 may respectively output received data 218.

Other details regarding uplink processing section 250 of basestation 220, such as for example a parallel-to-serial converter and a Fast Fourier Transformer, among other details, are not described in detail herein for purposes of clarity and not limitation.

For communication system 200, a MIMO system with N antennas 203 and 233 at basestation 220, basestation 220 may concurrently serve M antennas 222, where M<N for M and N positive integers greater than 1. In a multi-user MIMO environment, each user device 221 may have a single antenna or multiple antennas 222 coupled to a receiver thereof; however, such single or multiple antennas 222 when combined do not exceed N. Along those lines, an example of concurrently serving M single antenna users may be straightforwardly applied to user devices 221 having multiple antennas, and thus, even though M, as described below, may generally refer to M single antenna devices, M should more broadly be considered to include a number of antennas of single and/or multiple antenna devices being serviced by a basestation 220. It should be appreciated that, effectively, UE 221 does not have to determine an inverse of matrix A, because such inversion is performed in basestation 220 on both uplink and downlink sides. Thus, UE 221 may have a detector and a decoder respectively for detecting and decoding, but does not have to determine an inverse of matrix A.

For an uplink ("u"), all user devices 221 combined may transmit at most M signals concurrently, and basestation 220 may receive at most N signals at a time. Transmitted bits for all users may be subsumed in the following binary-valued vector:

$$x^u = [x_1^i; \ldots; x_L^u],$$

where L, which equals $M \log_2 (B)$ and $\log_2 (B)$, corresponds to the number of bits transmitted by each user. Such binary-valued bit stream may then be mapped (e.g., using Gray mapping) to the following transmit vector:

$$S^u \in O^M,$$

where O stands for the set of constellation points, and where B=|O| assuming for clarity that each user device of UE 221 employs the same constellation. Even though a same constellation is assumed for each user device 221, the following description may be generalized to different constellations for each user device 221. For clarity, average energy per transmit symbol may be assumed to correspond to the following:

$$\mathbb{E}|s_i^u|^2 = E_s, \forall i,$$

where vector $s^u$ may be transmitted over a wireless channel 210 in an uplink direction ("uplink"). Such transmission may be modeled using the following input-output relation:

$$y^u = H^u s^u + n^u, \quad (1)$$

where $y^u$ represents a receive vector, $n^u$ represents additive (e.g., thermal) noise at basestation 220, and $H^u$ represents an uplink channel matrix. Receive vector $y^u$ may be expressed as a binary-valued vector as follows:

$$y^u = [y_1^u; \ldots y_N^u].$$

Uplink channel matrix $H^u$ may be mathematically expressed as:

$$H^u \in \mathbb{C}^{N \times M}.$$

Uplink noise $n^u$ may be mathematically expressed as:

$$n \in \mathbb{C}^N,$$

whose entries are assumed to be independent and identically distributed ("i.i.d.") zero-mean Gaussian distributed with variance $N_o$ per complex entry.

For an uplink, basestation 220 may be configured to estimate $x^u$ for a channel matrix $H^u$ and estimate receive vector $y^u$, which estimation may be provided by a known MIMO detection algorithm, which is not described in unnecessary detail herein for purposes of clarity. Information for channel matrix $H^u$ may be obtained, such as by use of training pilot signals for example, as known.

For purposes of clarity and not limitation, the superscript u for uplink is omitted hereafter. For an uplink, basestation 220 may recover transmitted binary-valued data vectors from all users given a channel matrix H 241 and received vectors y. Because the number of users may be expected to be large in a massive MIMO system as compared to a small-scale MIMO system, low-complexity detection may be used to avoid prohibitively computational complex implementations. Two low-complexity linear detection approaches are linear zero-forcing ("ZF") detection and minimum mean-square error ("MMSE") detection. Either or both of ZF and MMSE may be used in basestation 220.

For purposes of clarity and not limitation, it shall generally be assumed that a known soft-output MIMO detection using MMSE parallel interference cancellation is used. Along those lines, a matched-filter output $y^{MF} = H^H y$ and an outer or Gram matrix $G = H^H H$ or $G = H H^H$ may be determined, as previously described. Then, a "regularized" matrix A for output may be determined, where such "regularized matrix" may be as follows:

$$A = GE_s + \sigma^2 I, \quad (2)$$

where $\sigma^2 = 0$ for ZF detection and $\sigma^2 = N_0$ for MMSE detection for $E_s$ representing an average energy for a symbol s. Estimates of a transmitted signal vector by UE 221 for detection by a detector 253 of a basestation 220 may be determined according to the following:

$$\hat{s} = A^{-1} y^{MF} = A^{-1} G s + A^{-1} n. \quad (3)$$

For hard-output ZF detection estimates, $A^{-1} G = I_M$, namely an identity matrix $I_M$, which may be substituted into the above equation, and hence the above equation may be simplified to:

$$\hat{s} = s + A^{-1} n.$$

Such simplification allows for component-wise slicing of O to obtain estimates for UE transmitted symbols. However, for soft-output MMSE detection estimates, $A^{-1} G$ is not equal to the identity matrix $I_M$. Thus, for MMSE detection, Equation (3) is significantly more complex to solve. Simplifying the right-hand side of Equation (3) may make MMSE detection more deployable. Along those lines, Equation (3) may further be decomposed for each user device of UE 221 as follows:

$$\hat{s}_i = \bar{a}_i^H g_i s_i + \sum_{j \neq i} \bar{a}_i^H g_i s_i + \bar{a}_i^H n = \mu_i x_i + w_i,$$

where for each user i, $w_i$ represents a noise-plus-interference ("NPI") at an ith user device of UE 221. With this decomposition, soft-output MMSE detection may amount to an approximation of entries of received transmitted symbols s as i.i.d. Gaussian distributed with mean and variance as follows:

$$\mu_i = a_i^H g_i$$

and $$\sigma_i^2 = E[w_i^2].$$

This approximation facilitates deployment of determining component-wise soft-output estimates in the form of log-likelihood ratios ("LLRs"). However, in order to determine NPI at a user device of UE 221 by soft-output MMSE detection, determination of the inverse matrix $A^{-1}$ is involved, which corresponds to a significant computational burden for an uplink side.

In general, determining an inverse matrix $A^{-1}$ may be a significant portion of detection on an uplink side of a communications channel. In particular, determination of such inverse matrix $A^{-1}$ may be a significant portion of detection for hard-output detection and/or soft-output detection. Along those lines, determination of such inverse matrix $A^{-1}$ may be a significant portion of a linear detection, including without limitation ZF or MMSE detection. Thus, as described below in additional detail, an estimate for such inverted matrix may be useful to reduce such complexity. Even though the above-description was directed at an uplink side of a communications channel, a downlink side of a communications channel may be similarly modeled, as described below in additional detail.

For a downlink side of a communications channel, using the same convention for a basestation 220 with N antennas for transmitting at most M streams to user devices of UE 221, an M-dimensional data vector to be transmitted to users corresponds to $s^d = [S_i, :::; s_M]$, where:

$$S_i^d \in O$$

In other words, a symbol $s^d$ to be transmitted on a downlink side to a user i is an element of a set of constellation points O. Similarly to the uplink side, average energy per transmitted symbol $s^d$ may correspond to:

$$\mathbb{E}|s_i^d|^2 = E_s, \forall i.$$

To avoid or reduce multi-user interference ("MUI"), downlink processing section 240 may generate an N-dimensional vector from $s^d$ using a predetermined precoding. Such N-dimensional vector to be transmitted from each antenna of antennas 203 may be designated by $x = p(s^d)$, where such function $p(s^d)$ may implement a selected precoding, including without limitation precoding for linear ZF or MMSE for example. A precoded vector x may be transmitted over a downlink side wireless channel, which may be modeled using the following input-output relation:

$$y^d = H^d p(s^d) + n^d. \quad (4)$$

In Equation (4), received vector $y^d$ may represent a vector received by all user devices of UE 221 as follows:

$$y^d \in \mathbb{C}^M.$$

A vector representing data received by a user i may be represented as follows:

$$y_i^d.$$

Like the uplink channel matrix, a downlink channel matrix may be represented as follows:

$$H^d \in \mathbb{C}^{M \times N},$$

and $n^d$ may represent a thermal noise vector for a downlink channel. Such downlink channel thermal noise may have the same distribution as thermal noise in the uplink channel. In many applications, channel reciprocity between an uplink channel and a downlink channel may be assumed, namely $H^u = (H^d)^H$.

In the following description, the superscript d to indicate a downlink side in some instances may be omitted for the sake of simplicity of exposition. In a downlink, precoding may be used by basestation 220 in order to avoid or reduce MUI. Along those lines, for example, linear ZF or MMSE precoding may be provided by precoder 201. For a downlink, prior to precoding by precoder 201, an outer or Gram matrix $G = HH^H$ may be determined, as previously described. Data symbols s may be multiplied with a linear precoding matrix P as a function of $p(s)$ as previously described, namely $p(s^d) = Ps^d$, where precoding matrix P may be mathematically expressed as follows:

$$P = H^H (GE_s + \sigma_d^2 I_M)^{-1} = H^H A^{-1}.$$

For ZF precoding, as previously described, variance equals zero, namely:

$$\sigma_d^2 = 0.$$

For MMSE precoding, as previously described, such variance equals $N_0$. For ZF precoding, signals received at antennas 222 of user devices of UE 221 correspond to y=s+n, as HP=$I_M$. However, for MMSE precoding, transmit signal energy may be traded off for MUI removal. However, in either of these forms of linear precoding, a significant determination burden, such as a computational burden for example, may correspond to determination of $A^{-1}$ by basestation 220, where such inverse matrix equality may be mathematically expressed as follows:

$$A^{-1} = (G + \sigma_d^2 I_M)^{-1},$$

which is analogous to an inverse matrix used for MMSE detection on an uplink side as previously described.

To recapitulate, uplink and downlink sides of a channel matrix have been described. In general, determining an inverse matrix $A^{-1}$ may be a significant portion of detection on an uplink side of a wireless communications channel 210 and/or precoding on a downlink side of a wireless communications channel 210 by a basestation 220. In particular, determination of such inverse matrix $A^{-1}$ may be a significant portion of detection and/or precoding for hard-output detection and/or soft-output detection. Along those lines, determination of such inverse matrix $A^{-1}$ may be a significant portion of linear detection and/or linear precoding, including without limitation ZF or MMSE detection and/or precoding. However, even though the above-description was directed at particular examples of detection and precoding, other applications where an inverse matrix is used may benefit from the following description of matrix inversion. As described below in additional detail, an estimate of an inverse of matrix A may be used by either or both matrix inversion modules 204 and 214.

Figures 1, 3:
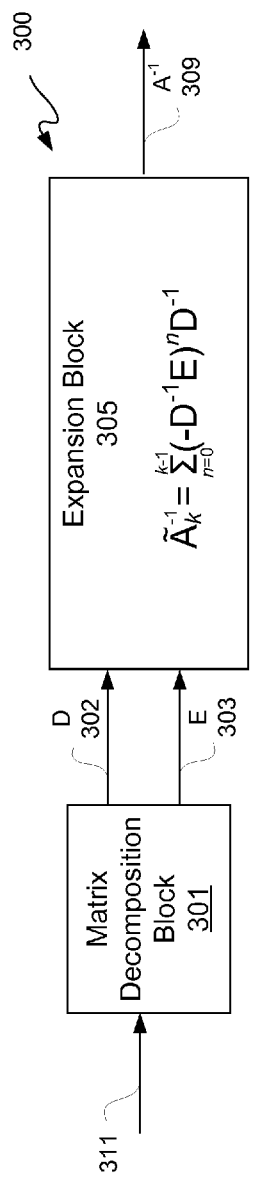
Figures 2, 3:
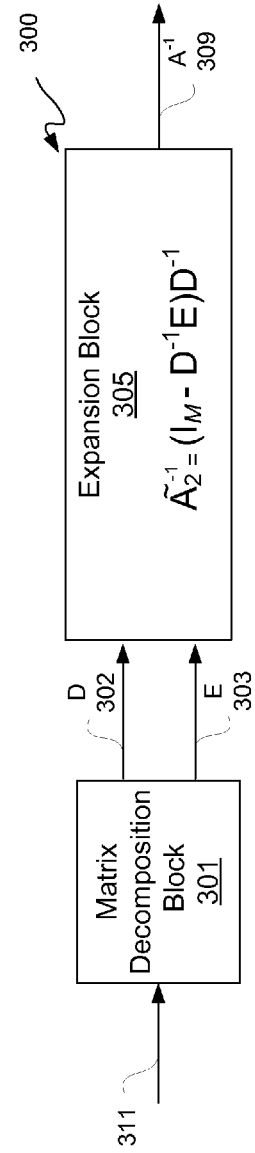

FIG. 3-1 is a block diagram depicting an exemplary matrix inversion module 300. Matrix inversion module 300 may be a matrix inversion module for an uplink and/or a downlink of a basestation 220 as in FIG. 2.

Generally, matrix inversion module 300 includes a matrix decomposition block 301 for factoring or decomposing received regularized matrix information A 311. For an FPGA implementation, matrix decomposition block 301 may be implemented using BRAM, distributed memory, FPGA off-chip memory and/or other memory for example, where addresses are provided to such memory to readout decomposed matrices, and address generation of such matrix decomposition block 301 may be implemented using an address sequencer for example; however, in other implementations other circuitry may be used for carrying out decomposition on matrices. In an embodiment, an address sequencer may be implemented in FPGA programmable resource fabric ("FPGA fabric"), or a combination of such FPGA fabric and DSP slices. Matrix decomposition block 301 may decompose regularized matrix information A into diagonal matrix information, D, 302 and off diagonal matrix information, E, 303 for output. Matrix inversion module 300 may further include an expansion block 305.

Expansion block 305 may be coupled to receive diagonal matrix information 302 and off diagonal matrix information 303 and may be configured to invert a matrix sum of diagonal matrix information 302 and off diagonal matrix information 303 as at least a portion of a series expansion, namely an expansion for k terms where k is a positive integer. For an FPGA implementation, matrix expansion block 305 may be implemented using DSP slices in combination with resources of FPGA fabric for example; however, in other implementations other circuitry for carrying out mathematical operations on matrices may be used. Expansion block 305 may carry out computations by using a processor, which processor may be embedded in an FPGA, instantiated in FPGA fabric, or externally coupled to an FPGA but couple to the FPGA. Moreover, a DSP processor, DSP slices, and/or a general-purpose processor ("GPP") may be used to provide expansion block 305. For purposes of clarity and not limitation, it shall be assumed that k is equal to 2; however, in other embodiments, k may be greater than 2. Optionally, k may be equal to one (1). In the past, only the diagonal matrix information was used, namely where k equals 1, which does not work well unless the ratio between basestation and UE antennas is large. In contrast, as described below in additional detail, diagonal matrix information is used as well as off diagonal matrix information. Such expansion may be provided as an inverse matrix approximation output 309 of expansion block 305 and may be provided as an approximation of an inverse of regularized matrix information A, namely may be provided as an approximation of $A^{-1}$, which may be used by a basestation 220 of FIG. 2 in place of an actual matrix inversion. Thus, matrix inversion module 204 and/or 214 of basestation 220 may be coupled to receive regularized matrix information A to provide an estimate of an inversion of such regularized matrix information A. Generally, such expansion to estimate may be of the form:

$$\tilde{A}_x^{-1} = \sum_{n=0}^{k-1} (-D^{-1}E)^n D^{-1}, \quad (5)$$

as described below in additional detail.

Determination of matrix inverse $A^{-1}$ heretofore was a significant computational burden. More specifically, matrix inversion heretofore may have involved $O(M^3)$ number of operations, which matrix inversion quickly becomes computationally prohibitive for conventionally and larger sized dimensions in large-scale MIMO systems. Such computational burden is further aggravated for large scale MIMO systems where the number of users M may be very large (e.g., in the order of tens to hundreds).

However, providing an expansion block 305 configured as described herein to provide an approximation of such inverse matrix reduces such computational burden. Along those lines, uplink detection and/or downlink precoding at basestation 220 using inversion of symmetric matrices as provided herein may result in efficient implementations for large-scale MIMO system, including without limitation where such large-scale MIMO systems are servicing a large number of users M.

FIG. 3-2 is a block diagram depicting an exemplary matrix inversion module 300 of FIG. 3-1 having an expansion block 305 configured for two terms, namely k=2 terms. Along those lines, expansion block 305 may be configured to provide an inverse matrix approximation output 309 from the following expansion:

$$\tilde{A}_2^{-1} = (I_M - D^{-1}E)D^{-1}. \quad (6)$$

Inverse matrix approximation output 309 may for example be a hard ZF output or MMSE soft detector output.

This approximation, which has lower complexity as compared to a direct matrix inversion, employs a Neumann series for approximating an inverse of matrix A. Processing matrix information 302 and 303 are used to provide an approximation for inverting matrix A. Generally, large-scale MIMO systems have a significantly higher number of antennas at basestation 220 than users to be served. If matrix A is close to an invertible matrix X satisfying:

$$\lim_{n\to\infty}((I-X^{-1}A)^n=0 \text{ or } \lim_{n\to\infty}((I-AX^{-1})^n=0,$$

then an inverse of matrix A can be rewritten using the following Neumann series:

$$A^{-1} = \sum_{n=0}^{\infty} (X^{-1}(X-A))^n X^{-1}.$$

For a large-scale MIMO system, matrix A in Equation (2) used for detecting and/or precoding is close to a diagonal matrix. In a large antenna limit, namely for N approaching infinity for a constant M, it may be shown that G approaches a scaled identity matrix $I_N$ for normalized i.i.d. zero-mean Gaussian channel matrices H. Large-scale MIMO systems may be leveraged for an approach to approximate a matrix inversion, as described below.

Figures 4, 5:
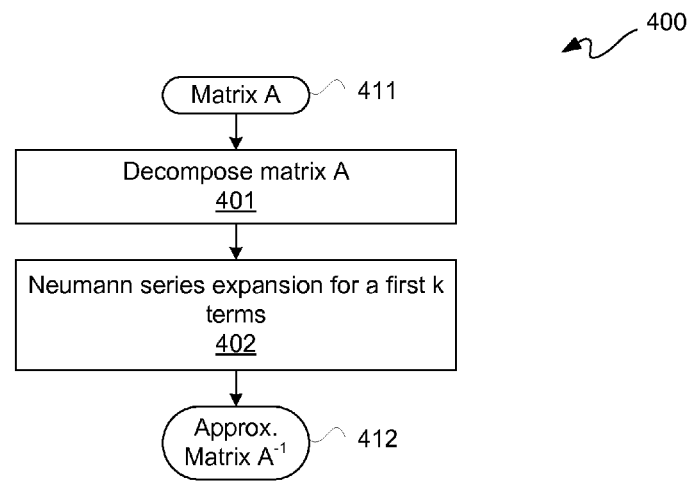
FIG. 4 is a flow diagram depicting an exemplary matrix inversion flow for approximating an inverse matrix.
FIG. 5 is a table diagram depicting an exemplary operations counts table, which tabulates compute complexity for a Neumann series-based solution parameterized on the order k of a Neumann expansion.

FIG. 4 is a flow diagram depicting an exemplary matrix inversion flow 400 for approximating an inverse matrix. Again, matrix inversion flow may be used to provide a matrix inversion module with significantly less complexity than in the past, which may be useful in large-scale MIMO systems and/or other systems using matrix inversion.

At 401, matrix A 411 as defined for example in Equation (2) may be decomposed or factored into constituent parts, namely diagonal matrix D and off diagonal matrix E such that by matrix addition A=D+E. By assuming that such diagonal matrix D is invertible and if either of the following conditions is true:

$$\lim_{n\to\infty}(-D^{-1}E)^n=0 \text{ or } \lim_{n\to\infty}(-ED^{-1})^n=0,$$

then an inverse of matrix A may be expanded by the following Neumann series:

$$A^{-1} = (D+E)^{-1} = \sum_{n=0}^{\infty} (-D^{-1}E)^n D^{-1}.$$

In other words, a matrix sum of diagonal matrix information D and off diagonal matrix information E is inverted, and this inversion is effectively provided by a Neumann series expansion. For k terms, the above Neumann series may be expressed as:

$$A^{-1} = \sum_{n=0}^{k-1} (-D^{-1}E)^n D^{-1} + (-D^{-1}E)^k G^{-1},$$

where matrix A represents regularized matrix information as expressed in Equation (2), D represents diagonal matrix information 302 from decomposition of matrix A, E represents off diagonal matrix information 303 from decomposition of matrix A, and G represents Gram Matrix information.

If only the first k terms of the above Neumann series, namely a portion of such expansion, are kept, an approximation of the inverse of matrix A may be expressed as indicated in Equation (5), though with a residual error matrix $R_k$. Such residual error matrix $R_k$ may be mathematically expressed as:

$$R_k = (-D^{-1}E)^k A^{-1}. \quad (7)$$

At 402, a Neumann series expansion for k terms may be performed using matrices E and D in accordance with Equation (5) to provide an approximation of an inverse of matrix $A^{-1}$. Such approximate matrix $A^{-1}$ 412 may be output from an operation at 402.

For k=1, the inverse of matrix A, namely matrix $A^{-1}$, is approximated by $D^{-1}$, which coincides with a matched-filter ("MF"), as effectively such approximation is simply scaling each dimension individually. However, MF precoding, for example, may only be useful for a very large-antenna limit.

However, for k=2, the approximate to an inverse of matrix A is given by Equation (6). This involves only $O(N^2)$ operations, which is relatively small as compared with the large N for k=1 terms. Furthermore, this is a significantly less number of operations than a direct or exact matrix inversion, and thus such an approximation may be determined more efficiently with less overhead than an exact matrix inversion. In particular, for MIMO systems where M is or becomes large, the savings in terms of computational complexity of using an approximation as in Equation (6) may be substantial. More generally, using the matrix inversion approximation of Equation (5) as a substitute for an exact inverted matrix $A^{-1}$ may provide a substantial reduction in integrated circuit overhead in large-scale MIMO systems.

For example, using the matrix inversion approximation of Equation (5) for ZF and MMSE detection, Equation (3) may be rewritten as follows:

$$\tilde{s} = \tilde{A}_k^{-1} y^{MF} = (A^{-1} - R_k) y^{MF} = A^{-1} y^{MF} - R_k y^{MF}.$$

By bounding an $l_2$-norm of residual error $\|R_k y^{MF}\|_2$ using Equation (7), such residual error may be mathematically expressed as:

$$\|R_k y^{MF}\|_2 = \|(-D^{-1} E)^k A^{-1} y^{MF}\|_2 \leq \|D^{-1} E\|_{2,2}^k \|A^{-1} y^{MF}\|_2,$$

where $\|\cdot\|_2$ corresponds to a spectral norm. Along those lines, it may be appreciated that if $\|D^{-1} E\|_{2,2} < 1$, an approximation error approaches zero exponentially fast as k approaches infinity. Moreover, for a large antenna limit where N approaches infinity, spectral norm $\|D^{-1} E\|_{2,2}$ approaches zero. Hence, using only a very small number of terms of a Neumann series expansion can substantially reduce error incurred by the approximation of Equation (5). Thus, in large-scale MIMO systems, such error may be substantially reduced, making the use of an approximation based on Equation (5) practical. In other words, an approximate matrix inversion as described herein may be significantly less complex than any of Cholesky decomposition, direct matrix inversion, QR decomposition, or LU factorization, and such significant reduction in complexity comes with minimal, if any, performance loss in large-scale MIMO systems. Along those lines, a block-error rate ("BLER") may be lower than conventional communication specifications employ to ensure reliable transmission.

Precoding or detecting as described herein may be embodied in an integrated circuit ("IC") chip. Such IC chip may be an FPGA, ASIC, SoC, ASSP, DSP, or other type of IC chip. For purposes of clarity by way of example and not limitation, for an FPGA implementation using for example DSP slices, the number of operations to be performed are generally indicated in FIG. 5, where there is shown a table diagram depicting an exemplary operations counts table 500, which tabulates compute complexity for a Neumann series-based solution parameterized on the order k of a Neumann expansion. Table 500 indicates how many division operations 501, multiplication operations 502, and addition operations 503 may be used for various implementations 511 of Equation (5) responsive to different values of k 510 for M user antennas. For k=3 terms, the number of multiplication operations 502 and addition operations 503 respectively includes the number of those operations for k=2 terms plus respective additional amounts as indicated in operations Table 500 for k=3. Generally, as described herein, k is equal to or greater than 2. However, it should be appreciated that the number of operations for k greater than 2 may be significantly more than the number of operations for k equal to 2. Yet performance improvement for the additional operations may not be substantial enough to justify the additional amount of overhead. Along those lines, k=2 may provide substantial performance with low overhead.

Challenges in terms of computational complexity for matrix inversion in uplink detecting and downlink precoding have been addressed by approximating a matrix inverse using a few Neumann-series terms, which significantly reduces the complexity compared to an explicit and exact matrix inversion. Furthermore, performance degradation in view of such reduced complexity is slight, and thus not meaningful in many applications, including without limitation computation of matrix inverses in large-scale MIMO systems. Using only the first two expansion terms in a Neumann series expansion may allow for outperformance of a conventional matched-filter approach and may achieve near optimal BLER performance, such as BLER on the order of $10^{-4}$. In addition, by using only the first two expansion terms in a Neumann series expansion, significantly less operations, as compared to an exact inversion such as a Cholesky decomposition for example, may be embodied to reduce IC overhead. Along those lines, substantial decreases in complexity of matrix inversion computation may be achieved while maintaining near to floor BLER performance, which facilitates corresponding hardware implementations of large-scale MIMO systems.

While the foregoing describes exemplary structures and methods, other and further embodiments in accordance with the one or more aspects may be devised without departing from the scope thereof, which is determined by the claims that follow and equivalents thereof. Claims listing steps do not imply any order of the steps. Trademarks are the property of their respective owners.

What is claimed is:

1. An apparatus in a MIMO (Multiple Input Multiple Output) communication system, comprising:
   a memory;
   one or more processor,
   wherein the one or more processor coupled to the memory and wherein the one or more processor includes:
   a matrix inversion module coupled to receive matrix information and to provide an approximation of an inversion of the matrix information;
   wherein the matrix inversion module comprises:
   a decomposition block coupled to receive the matrix information and to decompose the matrix information into diagonal matrix information and off diagonal matrix information; and
   an expansion block coupled to receive the diagonal matrix information and the off diagonal matrix information and to invert a matrix sum of the diagonal matrix information and the off diagonal matrix information by generation of a portion of a series expansion; wherein the portion of the series expansion is a portion of a Neumann series expansion for a finite number of k terms, for k equal to or greater than 2; and
   wherein the approximation of the inversion of the matrix information is provided by the portion of the Neumann series expansion for the k terms,
   wherein, the portion of the Neumann series expansion is for the k terms and is mathematically expressed as:

$$\tilde{A}_{\tilde{x}}^{-1} = \Sigma_{n=0}^{k-1} (-D^{-1} E)^n D^{-1},$$

where A represents the matrix information, D represents the diagonal matrix information, and E represents the off diagonal matrix information.

2. The apparatus according to claim 1, wherein the Neumann series expansion for the k terms is mathematically expressed as:

$$A^{-1} = \sum_{n=0}^{k-1} (-D^{-1} E)^n D^{-1} + (-D^{-1} E)^x G^{-1},$$

where A represents the matrix information, D represents the diagonal matrix information, E represents the off diagonal matrix information, and G represents outer Gram matrix information.

3. The apparatus according to claim 1, wherein for the k terms being k=2 terms, the portion of the Neumann series expansion is mathematically expressed as:

$$\tilde{A}_2^{-1} = (I_M - D^{-1} E) D^{-1},$$

where $I_M$ represents an identity matrix for an M number of user antennas.

4. The apparatus according to claim 1, wherein the matrix information is mathematically expressed as:

$$A=GE_s+\sigma^2 I,$$

where G represents a Gram matrix, I represent an identity matrix, $\sigma^2$ represent a variance, and $E_s$ represents an average energy for a transmitted symbol s.

5. The apparatus according to claim 1, wherein the matrix inversion module is for a linear zero-forcing detector.

6. The apparatus according to claim 1, wherein the matrix inversion module is for a minimum mean-square error detector.

7. The apparatus according to claim 1, further comprising:
a precoding matrix module;
wherein the matrix inversion module is coupled to provide the approximation of the inversion of the matrix information to the precoding matrix module.

8. The apparatus according to claim 7, further comprising a precoder coupled to the precoding matrix module and a plurality of antennas.

9. The apparatus according to claim 8, wherein the precoder and the plurality of antennas is for large-scale multiple-in, multiple-output ("MIMO") communication.

10. A method, comprising:
receiving input matrix information by a decomposition block;
decomposing with the decomposition block the input matrix information into diagonal matrix information and off diagonal matrix information;
receiving the diagonal matrix information and the off diagonal matrix information by an expansion block processor;
generating with the expansion block processor a portion of a series expansion to provide an inversion of a matrix sum of the diagonal matrix information and the off diagonal matrix information;
wherein the portion of the series expansion is an approximation of an inversion of the input matrix information;
outputting the inversion of the matrix sum;
wherein the portion of the series expansion is a portion of a Neumann series expansion for a finite number of k terms, for k equal to or greater than 2; and
wherein the approximation of the inversion of the input matrix information is provided by the portion of the Neumann series expansion for the k terms;

wherein, the portion of the Neumann series expansion is for the k terms and is mathematically expressed as:

$$\tilde{A}_{\tilde{x}}^{-1}=\Sigma_{n=0}^{k-1}(-D^{-1}E)^n D^{-1},$$

where A represents the matrix information, D represents the diagonal matrix information, and E represents the off diagonal matrix information.

11. The method according to claim 10, wherein the Neumann series expansion for the k terms is mathematically expressed as:

$$A^{-1} = \sum_{n=0}^{k-1} (-D^{-1}E)^n D^{-1} + (-D^{-1}E)^k G^{-1},$$

where A represents the input matrix information, D represents the diagonal matrix information, E represents the off diagonal matrix information, and G represents outer Gram matrix information.

12. The method according to claim 10, wherein for the k terms being k=2 terms, the portion of the Neumann series expansion is mathematically expressed as:

$$\tilde{A}_2^{-1}=(I_M-D^{-1}E)D^{-1},$$

where $I_M$ represents an identity matrix for an M number of user antennas.

13. The method according to claim 10, wherein the input matrix information is mathematically expressed as:

$$A=GE_s+\sigma^2 I,$$

where G represents Gram matrix information, I represent identity matrix information, $\sigma^2$ represent a variance, and $E_s$ represents an average energy for a transmitted symbol s.

14. The method according to claim 10, wherein the decomposition block and the expansion block processor are of a matrix inversion module of a linear zero-forcing detector.

15. The method according to claim 10, wherein the decomposition block and the expansion block processor are of a matrix inversion module of a minimum mean-square error detector.

16. The method according to claim 10, wherein the decomposition block and the expansion block processor are of a matrix inversion module coupled to a precoding matrix module for large-scale multiple-in, multiple-output ("MIMO") communication.

* * * * *